United States Patent
Fukuike et al.

(10) Patent No.: US 8,415,026 B2
(45) Date of Patent: Apr. 9, 2013

(54) WATER-BASED RUST PREVENTIVE PIGMENT, WATER-BASED RUST PREVENTIVE PAINT, AND HIGHLY CORROSION RESISTANT SURFACE-TREATED CHAIN

(75) Inventors: Yuji Fukuike, Osaka (JP); Tomohide Takada, Osaka (JP); Satoshi Sato, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 12/440,228

(22) PCT Filed: Sep. 5, 2007

(86) PCT No.: PCT/JP2007/067275
§ 371 (c)(1), (2), (4) Date: Mar. 5, 2009

(87) PCT Pub. No.: WO2008/029833
PCT Pub. Date: Mar. 13, 2008

(65) Prior Publication Data
US 2010/0040905 A1    Feb. 18, 2010

(30) Foreign Application Priority Data

Sep. 6, 2006   (JP) .................................. 2006-241607
Jan. 23, 2007  (JP) .................................. 2007-012908

(51) Int. Cl.
C23F 11/10    (2006.01)
C23F 15/00    (2006.01)
C23C 30/00    (2006.01)
C23C 26/00    (2006.01)
B32B 15/00    (2006.01)
C23C 24/00    (2006.01)

(52) U.S. Cl.
USPC ........... 428/659; 428/624; 428/657; 428/658

(58) Field of Classification Search .......... 428/624–627, 428/657–659
See application file for complete search history.

(56) References Cited

U.S. PATENT DOCUMENTS 4,040,842 A * 8/1977 Makishima et al. ......... 106/1.17
6,203,930 B1 * 3/2001 Ichikawa ...................... 428/655
(Continued)

FOREIGN PATENT DOCUMENTS

EP  0 177 786 A1   4/1986
EP  0 810 297 A1   12/1997
(Continued)

OTHER PUBLICATIONS

B. Muller et al., Metal Chelates of Citric Acid as Corrosion Inhibitors for Zinc Pigment, Corrosion Science, vol. 39, No. 8, pp. 1481-1485 (1997).*

(Continued)

*Primary Examiner* — Jennifer McNeil
*Assistant Examiner* — Xiaobei Wang
(74) *Attorney, Agent, or Firm* — Birch, Stewart, Kolasch & Birch, LLP (57) ABSTRACT

A chain component part has a first coating film formed on an iron base material using a water-based rust preventive paint containing a water-based rust preventive pigment containing a nitrate and having good storing stability. Since zinc is eluted earlier, generation of red rust caused by iron is suppressed, and thus durability is improved. A roller chain includes a zinc-iron alloy ground layer formed on an iron base material by impact zinc plating, a first coating film formed using the water-based rust preventive paint, and a second coating film formed using a water-based top coat paint containing a water-based pigment and a water-soluble or hydrolyzable silane coupling agent containing an amino group.

20 Claims, 4 Drawing Sheets

U.S. PATENT DOCUMENTS

| | | | |
|---|---|---|---|
| 6,610,422 B1 * | 8/2003 | Ooi et al. | 428/653 |
| 6,878,462 B1 * | 4/2005 | Umino et al. | 428/628 |
| 2004/0003752 A1 | 1/2004 | Ikegami et al. | |
| 2005/0147832 A1 * | 7/2005 | Okai et al. | 428/447 |
| 2011/0281992 A1 * | 11/2011 | Fukuike et al. | 524/440 |

FOREIGN PATENT DOCUMENTS

| | | | |
|---|---|---|---|
| JP | 61-67773 A | | 4/1986 |
| JP | 5-117558 A | | 5/1993 |
| JP | 6-9897 A | | 1/1994 |
| JP | 06-207765 A | | 7/1994 |
| JP | 7-127692 A | | 5/1995 |
| JP | 9-118989 A | | 5/1997 |
| JP | 9-317832 A | | 12/1997 |
| JP | 11-323181 A | | 11/1999 |
| JP | 3122037 B2 | | 10/2000 |
| JP | 2002-80776 A | | 3/2002 |
| JP | 2003-3271 A | | 1/2003 |
| JP | 2004-035828 | * | 2/2004 |
| JP | 2004-35828 A | | 2/2004 |
| JP | 2005-187925 A | | 7/2005 |
| JP | 2005-206872 A | | 8/2005 |
| JP | 2006-187679 A | | 7/2006 |
| JP | 2008144059 A | * | 6/2008 |
| JP | 2008144077 A | * | 6/2008 |

OTHER PUBLICATIONS

Danquing Zhu, et al., Corrosion protection of metals by water-based silane mixtures of bis-[trimethoxysilylpropyl]amine and vinyltriacetoxysilane, Progress in Orgainic Coatings, 49:42-53 (2004).*

JP 11-323181 to Nakazato et al., Published Japanese Application (Nov. 26, 1999)—Machine Translation.*

JP 2006-187679 to Suehiro et al., Published Japanese Application (Jul. 20, 2006)—Machnine Translation.*

K. Aramaki, Treatment of zinc surface with cerium (III) nitrate to prevent zinc corrosion in aerated 0.5 M NaCI, Corrosion Science, 43:2201-2215 (2001).*

* cited by examiner

WATER-BASED RUST PREVENTIVE PIGMENT, WATER-BASED RUST PREVENTIVE PAINT, AND HIGHLY CORROSION RESISTANT SURFACE-TREATED CHAIN

This application is the national phase under 35 U.S.C. §371 of PCT International Application No. PCT/JP2007/67275 which has an International filing date of Sep. 5, 2007 and designated the United States of America.

BACKGROUND

1. Technical Field

The present invention relates to a water-based rust preventive pigment having high storing stability underwater, a water-based rust preventive paint having the water-based rust preventive pigment, and a highly corrosion resistant surface-treated chain, such as a bushing chain and a roller chain, which is used under a corrosive atmosphere of salt water, acid, and alkali.

2. Description of Related Art

As a conventional rustproof agent for an iron surface, a rust preventive paint containing zinc and aluminum as metal pigments is widely used, utilizing sacrificial corrosion preventive actions of zinc and aluminum (the action of suppressing corrosion of iron by these metals eluted before elution of iron because these metals have an ionization tendency higher than that of iron).

Since such metal pigments react with water and corrode, they have low storing stability in a water-based paint. Therefore, there is a problem that the property of the water-based rust preventive paint blended with the metal pigments is damaged with time.

Japanese Patent Application Laid-Open No. 11-323181 discloses an invention of a water-based paint having a metal pigment, made by coating a metal powder with an organosulfur compound to make a metal pigment and blending the metal pigment, in order to improve the storing stability.

Further, a conventional corrosion resistant surface-treated chain used under a corrosive atmosphere of salt water, acid, and alkali is produced by assembling a chain with a connection pin, a bushing, an outer link plate, an inner link plate, and a roller, which are chain component parts, and then subjecting the chain to corrosion preventive processing such as nickel plating, zinc plating, and dacrotized coating.

In the conventional corrosion resistant surface-treated chain, in a case that a plating treatment liquid has not sufficiently permeated into the inter-spaces between the connection pin and the bushing, and between the bushing and the roller, internally propagating corrosion in a hole shape, which is generally called "pitting corrosion", cannot be completely suppressed. Further, the chain may be fatigued and broken when it is used under external load environment. Furthermore, when the plating treatment liquid is remained excessively in the inter-spaces between the connection pin and the bushing, and between the bushing and the roller, these members may be adhered to each other so as to cause bending failure of the chain or roller rotation failure.

In order to solve these problems, Japanese Patent Application Laid-Open No. 7-127692 discloses a corrosion resistant surface-treated chain produced by subjecting a connection pin, a bushing, an outer link plate, an inner link plate, and a roller, which are chain component parts, to corrosion preventive processing such as nickel plating, zinc plating, and dacrotized coating before assembling the chain, so as to prevent shortening of the life of the chain due to corrosion. Japanese Patent No. 3122037 discloses a corrosion resistant surface-treated chain produced by forming a zinc layer on a chain component part before assembling the chain, and forming a coating film on the zinc layer using a paint containing an aluminum powder and a silicone resin, so as to prevent generation of white rust on the surface of the chain component part. Japanese Patent Application Laid-Open No. 61-67773 discloses a corrosion resistant surface-treated chain produced by adhering a zinc alloy to the chain component parts before assembling the chain, and subjecting the surfaces of these parts to a chromate treatment.

SUMMARY

The invention of Japanese Patent Application Laid-Open No. 11-323181 has a problem that the organosulfur compound has an insufficient coating efficiency on a metal powder, and hence, sufficient storing stability cannot be acquired. That is, there is a problem that the paint is solidified in a short period of time when blending the metal pigment to make the paint, it cannot be used.

Further, in the conventional corrosion resistant surface-treated chain produced by subjecting the component parts to the corrosion preventive coating processing such as the nickel plating and the zinc plating before assembling the chain, when a layer is formed by nickel plating and zinc plating, hydrogen generated in a pickling process and a plating process permeates into the metal structures of the chain component parts so as to cause hydrogen brittleness. Thus, there is a problem that strength of the chain and the life of the chain may be reduced.

In the corrosion resistant surface-treated chain produced by subjecting the chain component parts to the corrosion preventive processing with the dacrotized coating before composing the chain, since a baking temperature is as high as 300° C. or more, the hardness of the chain component parts which are subjected to a carburizing quenching treatment decreases. Thus, there are problems that strength of the chain and a wear life of the chain decrease remarkably. Further, since the chain is dipped in a dispersion aqueous solution which is called a dacro coating solution containing chromium, there is a problem that the treatment may have a bad influence on environment.

Further, in a case of assembling the chain component parts which are subjected to the corrosion preventive processing such as the nickel plating, the zinc plating, and the dacrotized coating, a coating on a tacked portion is easily peeled when the bushing is pressed in and fitted to the inner link plate and the connection pin is pressed in and fitted to the outer link plate, and the peeled portion starts to rust very early. Thus, there is a problem that the assembled chain needs to be repaired.

Further, in the conventional corrosion resistant surface-treated chain subjected to the chromate treatment, when the chain component parts are assembled, hexavalent chromium having a bad influence on an environment may escape from a coating-peeled part of a tacked portion. Further, there is a problem that even if zinc alloy plating is reformed on the coating-peeled portion, adhesion of the plating is weak, and thus the portion rusts very early.

The present invention is to solve these problems, and has an object to provide a water-based rust preventive pigment having stability in water and having good storing stability by containing a nitrate to improve coating efficiency of an organic compound containing a mercapto group to a powder of a base metal such as zinc and to sufficiently suppress reaction of the base metal in water, and also to provide a water-based rust preventive paint containing the water-based rust preventive pigment.

Further, the present invention has an object to provide a water-based rust preventive pigment having rustproof property which lasts for a long period of time by containing a magnesium compound to suppress an elution amount of zinc, and also to provide a water-based rust preventive paint containing the water-based rust preventive pigment.

Further, the present invention has an object to provide a water-based rust preventive paint having rust proof property which lasts for a long period of time by containing a water-based rust preventive pigment containing aluminum. As for the water-based rust preventive paint, since aluminum is eluted before elution of zinc, the elution amount of zinc can be suppressed.

Further, the present invention has an object to provide a water-based rust preventive paint capable of keeping sacrificial corrosion preventive action of zinc for a long period of time by containing colloidal silica.

Further, the present invention has an object to provide a highly corrosion resistant surface-treated chain capable of suppressing generation of red rust caused by iron and thus improving durability, by having a first coating film which is formed on an iron base material of a chain component part using the aforementioned water-based rust preventive paint so that zinc is eluted earlier.

Further, the present invention has an objective to provide a highly corrosion resistant surface-treated chain having a rustproof effect for a longer period of time by having a zinc-iron alloy ground layer formed between the iron base material and the first coating film by impact zinc plating.

Further, the present invention has an objective to provide a highly corrosion resistant surface-treated chain capable of preventing the peeling of the first coating film by having a second coating film formed on the first coating film using a water-based top coat paint containing a water-based pigment and a water-soluble or hydrolyzable silane coupling agent containing an amino group.

Further, the present invention has an object to provide by adding a tungsten compound, hydroxy apatite and a pearl pigment to the water-based top coat paint, a highly corrosion resistant surface-treated chain capable of preventing permeation of corrosive factors and thinning a first coating film, as well as preventing peeling of coating films on the pressed-in portion of the inner link plate and the bushing and on the tacked portion of the outer link plate and the connection pin at a time of assembling of the chain, and thus omitting the repairing of coating.

Furthermore, the present invention has an object to provide a highly corrosion resistant surface-treated chain having a good rustproof property by adding lithium silicate to the water-based top coat paint so that when the coating powder of the first coating film is mixed into the water-based top coat paint at a time of coating of the water-based top coat paint, the second coating film is formed while gelling of the water-based top coat paint is properly suppressed.

A water-based rust preventive pigment according to the 1st invention is characterized by comprising powder of a base metal mainly containing zinc, an organic compound containing a mercapto group, and a nitrate.

In this invention, since the powder of a base metal is coated with the organic compound, reaction of the powder of a base metal with water in a water-based solvent is sufficiently suppressed, and thus storing stability is improved. At this time, the nitrate functions as a catalyst so as to promote chemical bonding of the organic compound to the powder of a base metal. Thus, coating efficiency increases.

A water-based rust preventive pigment according to the 2nd invention which is based on the first invention is characterized by further comprising a magnesium compound.

In this invention, since magnesium is eluted before the elution of zinc, the elution amount of zinc is suppressed, and thus the rustproof effect can last for a long period of time.

A water-based rust preventive pigment according to the 3rd invention which is based on the first or second invention is characterized in that the nitrate is magnesium nitrate or nickel nitrate.

In this invention, storing stability is preferable, and when the nitrate is magnesium nitrate, the rustproof effect is more preferable.

A water-based rust preventive paint according to the 4th invention is characterized by comprising the water-based rust preventive pigment according to any one of the first to third inventions.

In this invention, since the water-based rust preventive pigment according to any one of the first to third inventions is contained, the powder of a base metal does not react with water. Thus, generation of a lot of gas does not occur and the property of the coating is not damaged. The water-based rust preventive pigment is dispersed stably for a long period of time.

A water-based rust preventive paint according to the 5th invention which is based on the 4th invention is characterized by comprising a water-based rust preventive pigment containing aluminum.

In this invention, aluminum is contained in the pigment and is eluted before the elution of zinc. Thus, the elution amount of zinc is suppressed, and the rustproof property is continued for a long period of time.

A water-based rust preventive paint according to the 6th invention which is based on the 4th or 5th invention is characterized by further comprising colloidal silica.

In this invention, the sacrificial corrosion preventive action of zinc can be maintained for a long period of time.

A highly corrosion resistant surface-treated chain according to the 7th invention is characterized in that the chain is constructed by a pair of outer link plates and a pair of inner link plates connected alternately, parts including the outer link plates and the inner link plates are made of an iron base material, and a first coating film is formed on the iron base material of the parts using the water-based rust preventive paint according to any one of the 4th to 6th invention.

In this invention, the iron base material is coated with the first coating film formed using the water-based rust preventive paint. Thus, since zinc having an ionization tendency higher than that of iron is earlier eluted, generation of red rust caused by iron is suppressed so as to promote the corrosion prevention of iron. That is, since generation of red rust is suppressed by sacrificial corrosion preventive action of zinc, durability of the chain is improved.

A highly corrosion resistant surface-treated chain according to the 8th invention which is based on the 7th invention is characterized by comprising a zinc-iron alloy ground layer formed by impact zinc plating between the iron base material and the first coating film.

Here, the impact zinc plating is plating which forms a layer structure by laminating a blast material made of a zinc-iron alloy which is blasted to the iron base material surface.

In this invention, since the iron base material constituting the chain parts is coated by the impact zinc plating, generation of red rust is suppressed by the sacrificial corrosion preventive action of zinc contained in the zinc-iron alloy ground layer and the first coating film. Thus, durability of the chain is increased.

A highly corrosion resistant surface-treated chain according to the 9th invention which is based on the 7th or 8th invention is characterized by comprising a second coating film formed on the first coating film using a water-based top coat paint containing a water-based pigment and a water-soluble or hydrolyzable silane coupling agent containing an amino group.

In this invention, since the first coating film is coated with the second coating film, the peeling of the first coating film is prevented.

A highly corrosion resistant surface-treated chain according to the 10th invention which is based on the 9th invention is characterized in that the water-based top coat paint further contains a tungsten compound, hydroxy apatite, and a pearl pigment.

In this invention, since the water-based top coat paint further contains a tungsten compound, hydroxy apatite and a pearl pigment, the permeation of corrosive factors can be prevented, and the thinning of the under coating film can be attained. Further, the peeling of the coating films on the pressed-in portion of the inner link plate and the bushing and on the tacked portion of the outer link plate and the connection pin at a time of assembling the chain is prevented, and thus the repairing of the coating film can be omitted.

A highly corrosion resistant surface-treated chain according to the 11th invention which is based on the 9th or 10th invention is characterized in that the water-based top coat paint further contains lithium silicate.

In this invention, when the coating powder of the first coating film is mixed into the water-based top coat paint at a time of coating of the water-based top coat paint, the second coating film is formed while gelling of the water-based top coat paint is properly suppressed, and thus a highly corrosion resistant surface-treated chain can be obtained.

According to the 1st invention, since the efficiency of coating of the organic compound containing a mercapto group on the powder of a base metal such as zinc is increased by the nitrate, reaction of the powder of a base metal with water in water-based solvent is sufficiently suppressed. Therefore, storing stability in the case of obtaining the water-based rust preventive paint using the water-based rust preventive pigment is good, and the loss of zinc can be suppressed.

According to the 2nd invention, the pigment contains magnesium and magnesium is eluted before the elution of zinc. Thus, the elution amount of zinc can be suppressed, and the rustproof property can be maintained for a long period of time.

According to the 3rd invention, since magnesium nitrate or nickel nitrate are contained as the nitrate, storing stability is good. When the nitrate is magnesium nitrate, the rustproof property is more preferable.

According to the 4th invention, since the water-based rust preventive pigment according to any one of the 1st to 3rd inventions is contained, the powder of a base metal does not react with water, and hence, generation of a lot of gas does not occur. Thus, the property is not damaged by the gas, and the water-based metal pigment is stably dispersed for a long period of time.

According to the 5th invention, the water-based rust preventive paint contains the water-based rust preventive pigment containing aluminum. Since aluminum is eluted before the elution of zinc, the elution amount of zinc is suppressed, and the rustproof property is maintained for a long period of time.

According to the 6th invention, since colloidal silica is contained, the sacrificial corrosion preventive action of zinc can be maintained for a long period of time.

According to the 7th invention, the first coating film is formed on the iron base material of the chain component parts using the water-based rust preventive paint according to any one of the 4th to 6th inventions. Thus, zinc is eluted earlier, and generation of red rust caused by iron is suppressed so as to promote the corrosion prevention of iron. The bending failure and the roller rotation failure which are caused by red rust can be suppressed for a long period of time.

According to the 8th invention, the zinc-iron alloy ground layer is formed between the iron base material and the first coating film by impact zinc plating. Thus, the rustproof property is maintained for a longer period of time, and the bending failure and the roller rotation failure which are caused by red rust can be suppressed for a long period of time.

According to the 9th invention, the second coating film is formed on the first coating film using the water-based top coat paint containing the water-based pigment and the water-soluble or hydrolyzable silane coupling agent containing an amino group. Thus, the peeling of the first coating film is prevented.

According to the 10th invention, since the water-based top coat paint further contains a tungsten compound, hydroxy apatite, and a pearl pigment, the permeation of corrosive factors can be prevented and the thinning of the first coating film can be attained. Further, the peeling of the coating films on the pressed-in portion of the inner link plate and the bushing and on the tacked portion of the outer link plate and the connection pin at a time of assembling of the chain is prevented, and thus the repairing of the coating film can be omitted.

According to the 11th invention, when the coating powder of the first coating film is mixed into the water-based top coat paint at a time of coating of the water-based top coat paint, the second coating film can be formed while gelling of the water-based top coat paint is properly suppressed, and thus the rustproof property is good.

The above and further objects and features will more fully be apparent from the following detailed description with accompanying drawings.

DETAILED DESCRIPTION

The powder of a base metal used for the water-based rust-preventive pigment of the present invention mainly includes zinc, and can also include metals such as aluminum and Sn, which are used for a general rust preventive paint or a metal paint. It is preferable that the powder of a base metal includes aluminum or an aluminum alloy in zinc or a zinc alloy. The particle size of the powder and form of the powder are not particularly restricted, and the powder can have a spherical form, a flake form, and a rod form. Particularly, when flake-formed powder is used, a coating effect to an object to be coated is good when the powder is added to a paint, and the coated object can have an excellent rustproof property.

In addition, zinc and aluminum can also be mixed to prepare one water-based rust preventive pigment, and can be blended separately as described below to prepare two kinds of water-based rust preventive pigment.

The flake-formed metal powder is obtained by subjecting metal powder to a spreading process by a ball mill or an attritor, and it is preferable that an average aspect ratio (an average longitudinal diameter/an average thickness) of the powder is 10 or more.

The flake-formed metal powder thus obtained is kneaded with an organic compound containing a mercapto group, and further kneaded after adding a nitrate to it. Thereby, a water-based rust preventive pigment of the present invention having the metal powder coated with the organic compound can be obtained. The form of the pigment can be either of a powder form or a slurry form.

As for a timing of an addition of the nitrate, it can be added together with the organic compound in the spreading process, or can be added at the time of mixing of the metal powder and the organic compound as described above.

In the spreading treatment, the aforementioned organic compound can be used as a pulverization assistant and directly coated on the metal surface. Alternatively, a saturated fatty acid such as stearic acid, an unsaturated fatty acid such as oleic acid, and hydrofluoric acid salt can be used together as a general pulverization assistant.

Further, in the spreading process and the kneading process, a surfactant and the aforementioned pulverization assistant can be added as a dispersion auxiliary.

The kneading process can be carried out under existence of an organic solvent. Particularly, in a case that a water-soluble solvent is used, the treated slurry can be added to the water-based rust preventive paint as it is as a metal pigment, so it is preferable.

As for the water-soluble solvent, a glycol-based solvent such as propylene glycol and ethylene glycol, an alcohol-based solvent such as ethanol and isopropanol, and a glycol-ether-based solvent such as triethyleneglycolmonomethylether and dipropyleneglycolmonomethylether, can be used.

As for the organic compound containing a mercapto group, 3-mercaptopropionic acid, ethylhexyl mercaptopropionate, methoxybutyl mercaptopropionate, tridecyl mercaptopropionate, pentaerythritol tetrakispropionate, 4-mercaptophenol, thioglycolic acid, monoethanolamine thioglycolate, ethylhexyl thioglycolate, methyl thioglycolate, and ethyl thioglycolate, can be used.

The organic compound can be used independently or two or more kinds can be used together.

The adding amount of the organic compound to the metal powder is preferably from 1 to 13 mass parts (parts by mass) to 100 mass parts of the metal powder, more preferably from 3 to 13 mass parts, further more preferably from 3 to 10 mass parts, and particular preferably from 5 to 8 mass parts. When the adding amount is less than 1 mass part, the surface of the metal powder is not sufficiently treated so that the stability in water is insufficient. When the adding amount is more than 13 mass parts, the organic compound is to be excessive, and thus further improved stability in water is not expected.

As the nitrate contained in the water-based rust preventive pigment of the present invention, potassium nitrate, calcium nitrate, magnesium nitrate, nickel nitrate, and cobalt nitrate can be used. Particularly, nickel nitrate and magnesium nitrate are preferable.

The adding amount of the nitrate is preferably within from 0.1 to 10 mass parts to 100 mass parts of the metal powder, more preferably from 3 to 9 mass parts, and further more preferably from 3 to 7 mass parts. When the adding amount is less than 0.1 mass parts, it is insufficient to increase a coating efficiency of the organic compound to the surface of the metal powder, and thus the stability of the water-based rust preventive pigment in water is insufficient. When the adding amount is more 10 mass parts, further improved stability in water is not expected.

The nitrate can be used independently or two or more kinds can be used together.

It is preferable that the water-based rust preventive pigment further contains a magnesium compound.

The mass ratio of magnesium contained in the water-based rust preventive pigment to zinc is preferably within from 0.05 mass % to 10 mass %, more preferably from 0.2 mass % to 2.0 mass %, and further more preferably from 0.4 mass % to 1.0 mass %. In a case that the ratio is within from 0.05 mass % to 10 mass %, when a water-based rust preventive paint including the water-based rust preventive pigment is coated on metal parts, magnesium is eluted before the elution of zinc. Thus, the elution amount of zinc is suppressed, and the rustproof property is continued for a long period of time.

As for the water-based rust preventive pigment of the present invention, each component can be added separately, or some or all of the components can be previously mixed and added. Further, the components can be mixed with water and the aforementioned solvent so as to be added in a slurry form.

The water-based rust preventive paint can solely include a water-based rust preventive pigment containing only zinc as a metal, and can also include a water-based Al rust preventive pigment containing aluminum together with the water-based zinc rust preventive pigment. Alternatively, as described above, instead of the water-based rust preventive pigment prepared by mixing the two water-based rust preventive pigments, one water-based rust preventive pigment prepared by mixing zinc and aluminum can be used.

Particularly, when zinc and aluminum are used together, generation of white rust caused by the water-based zinc rust preventive pigment can be suppressed, and thus it is preferable.

At this time, a mass ratio of zinc and aluminum is preferably from 70/30 to 99/1, more preferably from 78/22 to 96/4, and further more preferably from 82/18 to 90/10. When the mass ratio is from 70/30 to 99/1, generation of white rust can be suppressed properly.

Further, the water-based rust preventive paint can include a water-soluble solvent such as an alcohol-based solvent, a glycolether-based solvent, and a glycol-based solvent, and an additive for a paint such as a surfactant, a dispersant, and a defoamant.

It is preferable that the water-based rust preventive paint of the present invention further includes colloidal silica. The water-based rust preventive paint preferably contains colloidal silica being within from 5 mass % to 10 mass %. When the water-based rust preventive paint contains colloidal silica being within from 5 mass % to 10 mass %, the sacrificial corrosion preventive action of zinc can be maintained for a long period of time.

The highly corrosion resistant surface-treated chain of the present invention can be a bushing chain, which includes a pair of inner link plates provided separately, a bushing pressed in and fitted to bushing pressing-in holes of the plates, a pair of outer link plates provided on the outer side of the inner link plates and connected with the front and back inner link plates, and a connection pin loosely fitted to an inner peripheral face of the bushing and fitted to pin pressing-in holes of the outer link plates, or can be a roller chain, in which a roller is further provided to be loosely fitted to outer peripheral faces of the aforementioned connection pin and the bushing in the bushing chain.

The particular applications of the highly corrosion resistant surface-treated chain of the present invention will be described. The highly corrosion resistant surface-treated chain of the present invention can be applied to conveyance chains such as a conveyor chain used for a drive mechanism of a food conveying tray conveyor which is used under high humidity being subjected to periodical washing, a conveyor chain used for a drive mechanism of a roller conveyor and drive mechanisms of a brush and a blow in a car washer on which water and a detergent fall, a suspending chain of a stacker crane for mushroom cultivating which is used under high temperature and high humidity, a conveyor chain used for a drive mechanism of a roller conveyor for washing and conveying a bottle case on which a washing liquid falls, a conveyor chain used for running in water and scraping sludge precipitated in the water, and a conveyor chain used for a drive mechanism of a conveyor installed in the field near the seashore and subjected to briny air, or a transmission chain for transmitting power used in an engine.

Specific forms of the inner link plate and the outer link plate used in the highly corrosion resistant surface-treated chain of the present invention can be any one of an oval form and a gourd form.

The highly corrosion resistant surface-treated chain has a first coating film, which is formed on the iron base material of the aforementioned component parts using the water-based rust preventive paint of the present invention.

It is preferable that the highly corrosion resistant surface-treated chain of the present invention has a zinc-iron alloy ground layer formed by impact zinc plating between the iron base material and the first coating film.

It is further preferable that the highly corrosion resistant surface-treated chain of the present invention has a second coating film, which is formed on the first coating film using a water-based top coat paint containing a water-soluble or hydrolyzable silane coupling agent containing an amino group.

As a binder of the water-based top coat paint of the present invention, any binder mainly including a water-soluble or hydrolyzable silane coupling agent containing an amino group and being capable of preventing peeling of the first coating film can be used.

As for the water-soluble or hydrolyzable silane coupling agent containing an amino group, for example, N-(2-aminoethyl)-3-aminopropylmethyldimethoxy silane, N-(2-aminoethyl)-3-aminopropyltrimethoxy silane, N-(2-aminoethyl)-3-aminopropyltriethoxy silane, 3-aminopropyltrimethoxy silane, 3-aminopropyltriethoxy silane, 3-triethoxysilyl-(1,3-dimethylbutylidene)propylamine, N-phenyl-3-aminopropyltrimethoxy silane, and N-(vinylbenzyl)-2-aminoethyl-3-aminopropyltrimethoxy silane, can be used. One kind or two or more kinds of these silanes can be used.

The water-soluble or hydrolyzable silane coupling agent containing an amino group used for the water-based top coat paint functions as a binder when coating at a baking temperature of 180° C. or less.

It is preferable that the water-based top coat paint further contains a tungsten compound, hydroxy apatite, and a pearl pigment. By containing these, permeation of corrosive factors such as salt water into the second coating film can be suppressed under a corrosive atmosphere.

Specific examples of the tungsten compound are ammonium metatungstate, potassium tungstate, sodium tungstate, phosphotungstic acid, and tungstosilicic acid. The blending amount is preferably within from 10 to 50 mass parts with respect to 100 mass parts of the silane coupling agent containing an amino group.

For example, when $Na_2WO_4$ is used as the tungsten compound and aminopropyltriethoxy silane is used as the silane coupling agent containing an amino group, the mass ratio of $Na_2WO_4$ to aminopropyltriethoxy silane is preferably from 10 mass % to 50 mass %.

It is preferable that hydroxy apatite being within from 0.5 mass % to 2 mass % is contained in the water-based top coat paint.

It is preferable that the pearl pigment being within from 1 mass % to 10 mass % of is contained in the water-based top coat paint.

In a case that the water-based top coat paint contains the tungsten compound, hydroxy apatite, and the pearl pigment within the aforementioned ranges, when the second coating film is formed using the water-based top coat paint, the permeation of corrosive factors can be prevented and thinning of the first coating film can be attained. In addition to this, peeling of the coating films on the pressed-in portion of the inner link plate and the bushing and on the tacked portion of the outer link plate and the connection pin at a time of assembling of the chain can be prevented, and thus the repair of the coating film can be omitted.

It is preferable that the water-based top coat paint further contains lithium silicate.

As for the lithium silicate, a mol ratio of $SiO_2/Li_2O$ is 3.2 to 3.8. When aminopropyltriethoxy silane is used as the silane coupling agent containing an amino group, it is preferable that the mass ratio of lithium silicate to aminopropyltriethoxy silane is within 18 mass % to 72 mass %.

In a case that the ratio is within from 18 mass % to 72 mass %, gelling of the water-based top coat paint is properly suppressed when the powder of the coating film of the water-based rust preventive paint is mixed into the water-based top coat paint at a time of coating.

The water-based top coat paint can be obtained by mixing and stirring a pigment with a binder according to a general production method. At this time, a water-soluble solvent such as water, an alcohol-based solvent, a glycolether-based solvent, and a glycol-based solvent, and an additive for a paint such as a surfactant, a dispersant and a defoamant, can be blended.

Further, a polycarboxylic acid-based dispersant, a nonion or anion-based surfactant, a urethane-based thickener, and a silicone-based or an acrylic-based anti-foam agent, which are general additives for a paint, can be blended, and further, a leveling agent can be blended.

Since the water-based rust preventive paint and the water-based top coat paint, which are used for the surface treatment for the component parts of the highly corrosion resistant surface-treated chain of the present invention, have the aforementioned composition, they can be baked and dried at a temperature of 180° C. or less for approximately 30 to 40 minutes.

Therefore, the hardness of the chain component parts does not decrease, and reduction in the strength of the chain and the life of the chain can be suppressed.

EXAMPLES

The present invention will be described in detail below with examples and comparative examples, but is not limited to these examples.

(1) Water-Based Rust Preventive Pigment

Example 1

According to a blending ratio in Table 1 (indicated with mass parts), a zinc powder slurry (a zinc paste) according to Example 1 of the present invention was acquired by mixing and stirring a flake-formed zinc powder (an average longitudinal diameter of 15 μm, an average thickness of 0.5 μm), tridecyl mercaptopropionate, a surfactant, and a dispersion auxiliary in triethyleneglycolmonomethylether for 3 hours, further adding and mixing nickel nitrate, and stirring. As for the zinc paste, surfaces of the zinc powder were coated with tridecyl mercaptopropionate. In addition, the mass ratio of Ni to zinc was 0.65 mass %.

TABLE 1

| | EXAMPLE | | | | COMPARATIVE EXAMPLE | | | | | | (MASS PART) |
|---|---|---|---|---|---|---|---|---|---|---|---|
| | 1 | 2 | 3 | 4 | 1 | 2 | 3 | 4 | 5 | 6 | 7 |
| TRIETHYLENEGLYCOL-MONOMETHYLETHER | 31 | 31 | 31 | 31 | 31 | 31 | 31 | 31 | 31 | 31 | 31 |
| SURFACTANT | 0.43 | 0.43 | 0.43 | 0.43 | 0.43 | 0.43 | 0.43 | 0.43 | 0.43 | 0.43 | 0.43 |
| DISPERSION AUXILIARY | 0.63 | 0.63 | 0.63 | 0.63 | 0.63 | 0.63 | 0.63 | 0.63 | 0.63 | 0.63 | 0.63 |
| TRIDECYL MERCAPTOPROPIONATE | 4.18 | 4.18 | 4.18 | 4.18 | 4.18 | 4.18 | 4.18 | 4.18 | 4.18 | 4.18 | 4.18 |
| Zn | 63 | 63 | 63 | 63 | 63 | 63 | 63 | 63 | 63 | 63 | 63 |
| NICKEL NITRATE | 2.03 | — | — | — | — | — | — | — | — | — | — |
| MAGNESIUM NITRATE | — | 4.33 | — | — | — | — | — | — | — | — | — |
| CALCIUM NITRATE | — | — | 2.41 | — | — | — | — | — | — | — | — |
| COBALT NITRATE | — | — | — | 2.03 | — | — | — | — | — | — | — |
| NO NITRATE | — | — | — | — | — | — | — | — | — | — | — |
| NICKEL CHLORIDE | — | — | — | — | — | 1.66 | — | — | — | — | — |
| COBALT CHLORIDE | — | — | — | — | — | — | 1.66 | — | — | — | — |
| CALCIUM SULFATE | — | — | — | — | — | — | — | 1.76 | — | — | — |
| BASIC NICKEL CARBONATE | — | — | — | — | — | — | — | — | 0.87 | — | — |
| POTTASIUM CHLORIDE | — | — | — | — | — | — | — | — | — | 0.78 | — |
| NICKEL SULFATE | — | — | — | — | — | — | — | — | — | — | 1.84 |

Examples 2 to 4

As shown in Table 1, zinc pastes of Examples 2 to 4 were acquired by the same process as that of Example 1 except that magnesium nitrate, calcium nitrate, and cobalt nitrate were blended respectively instead of nickel nitrate. The mass ratio of each inorganic salt to zinc metal was 0.65 mass %.

Comparative Example 1

A zinc paste of Comparative example 1 was acquired by the same process as that of Example 1 except that a nitrate was not blended.

Comparative Examples 2 to 7

As shown in Table 1, zinc pastes of Comparative examples 2 to 7 were acquired by the same process as that of Example 1 except that nickel chloride, cobalt chloride, calcium sulfate, basic nickel carbonate, potassium chloride, and nickel sulfate were blended respectively instead of nickel nitrate. Each mass ratio of the inorganic salts to zinc metal was 0.65 mass %.

Examples 1 to 4 and Comparative examples 1 to 7 were subjected to the following evaluation test of stability to water.

[Evaluation Test of Stability to Water]

In each zinc paste of Examples 1 to 4 and Comparative examples 1 to 7, the zinc paste was measured to be 20 g and taken into an erlenmeyer flask of 200 ml, and 100 ml of pure water was added to the zinc paste and fully stirred. Then a measuring pipet with a rubber plug was attached to the erlenmeyer flask and left to stand for 8 hours at 40° C. Then, a gas generation amount was measured.

Figure 1:
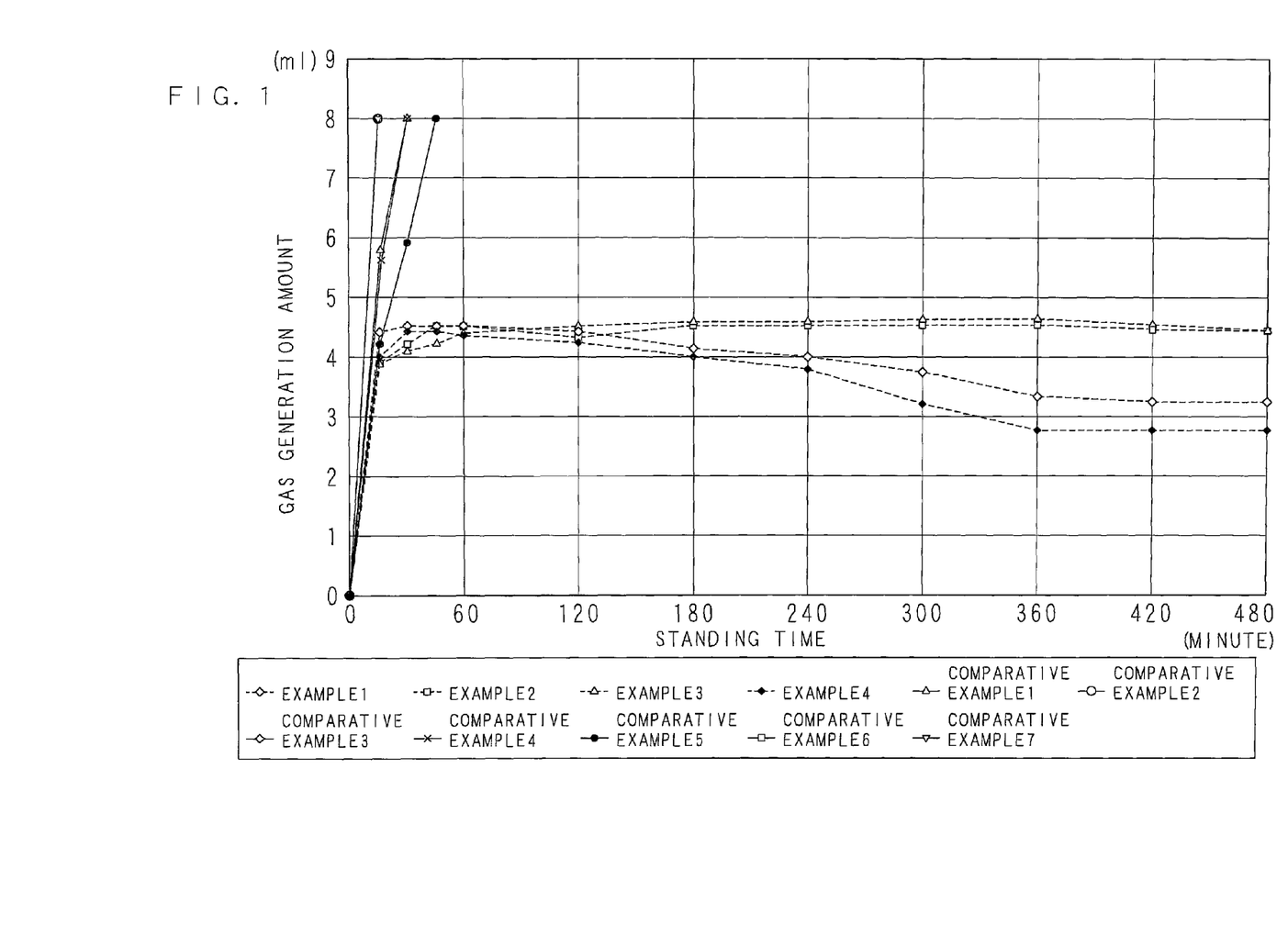
FIG. 1 is a graph illustrating the relationship between a standing time and a gas generation amount in a stability evaluation test to water.

FIG. 1 is a graph illustrating a relationship between a standing time and a gas generation amount in the test.

According to the graph in FIG. 1, it was found that when a nitrate was used in a coating of surface of the zinc powder with an organic compound containing a mercaprto group, a coating efficiency was improved. Thus, generation of hydrogen caused by reacting zinc with water was suppressed in the water-based solvent, and stability to water was improved. Therefore, the long-term storing stability is improved. Further, clearly from the effects of Comparative examples 2 to 7, the effect resulted from the improvement of stability to water cannot be attained by other inorganic salts.

(2) Water-Based Rust Preventive Paint

The results of the test carried out blending a water-based rust preventive paint will be described below.

Example A

According to a blending ratio in Table 2 (indicated with mass ratios), a water-based zinc rust preventive pigment (a zinc paste) was acquired by mixing and stirring a flake-formed zinc powder (an average longitudinal diameter of 15 μm, an average thickness of 0.5 μm), ethylhexyl thioglycolate, a surfactant (1), and a dispersion auxiliary in dipropyleneglycolmonomethylether for 3 hours, further adding and mixing magnesium nitrate to them, and stirring.

A water-based rust preventive paint according to Example A was acquired by blending a surfactant (2), water, Asahi KASEI ALUMINUM PASTE AW-612 (an aluminum pigment: an aluminum paste, produced by ASAHI KASEI CHEMICALS CORPORATION), water, KBP-90 (3-aminopropyltriethoxy silane, produced by Shin-Etsu Chemical Co., Ltd.), BYK-420 (a flowability improvement agent, produced by BYK-Chemie Corporation), and DMAC-ST (colloidal silica, produced by NISSAN CHEMICAL INDUSTRIES, LTD.) to the acquired zinc paste in this order.

TABLE 2

(MASS PART)

| | EXAMPLE | | | | | | | |
|---|---|---|---|---|---|---|---|---|
| | A | B | C | D | E | F | G | H |
| ZINC PASTE | | | | | | | | |
| DIPROPYLENEGLYCOLMONOMETHYLETHER | 18.8 | 18.8 | 18.8 | 18.8 | 18.8 | 18.8 | 18.8 | 18.8 |
| SURFACTANT (1) | 1 | 1 | 1 | 1 | 1 | 1 | 1 | 1 |
| DISPERSION AUXILIARY | 0.2 | 0.2 | 0.2 | 0.2 | 0.2 | 0.2 | 0.2 | 0.2 |
| ETHYLHEXYL THIOGLYCOLATE | 1.8 | 1.8 | 1.8 | 1.8 | 1.8 | 1.8 | 1.8 | 1.8 |
| Zn | 27.3 | 27.3 | 27.3 | 27.3 | 27.3 | 27.3 | 27.3 | 27.3 |
| MAGNESIUM NITRATE | 1.8 | 1.8 | 1.8 | 1.8 | 1.8 | 1.8 | 1.8 | 1.8 |
| SURFACTANT (2) | 10 | 10 | 10 | 10 | 10 | 10 | 10 | 10 |
| WATER | 7 | 7 | 7 | 7 | 7 | 7 | 7 | 7 |
| AW-612 | 2.9 | 2.9 | 2.9 | 2.9 | 2.9 | 2.9 | 2.9 | 2.9 |
| WATER | 2.3 | 2.3 | 2.3 | 2.3 | 2.3 | 2.3 | 2.3 | 2.3 |
| KBP-90 | 9.2 | 9.2 | 8 | 8 | 9.2 | 9.2 | 8 | 8 |
| BYK-420 | 1.8 | 1.8 | 1.8 | 1.8 | 1.8 | 1.8 | 1.8 | 1.8 |
| DMAC-ST | 6 | 0 | 6 | 0 | 6 | 0 | 6 | 0 |
| TOTAL | 90.1 | 84.1 | 88.9 | 82.9 | 90.1 | 84.1 | 88.9 | 82.9 |

Examples B to H

According to a blending ratio in Table 2, water-based rust preventive paints of Examples B to H were acquired by the same process as that of Example A except that the blending amount of 3-aminopropyltriethylethoxy silane was changed and the existence or nonexistence of the addition of colloidal silica was changed. The colloidal silica was added in Examples A, C, E, and G but not added in Examples B, D, F, and H.

Examples A to H were subjected to the following evaluation test of stability to water.

[Evaluation Test of Stability to Water]

Each water-based rust preventive paint of Examples A to H was measured to be 20 g and taken into an erlenmeyer flask of 200 ml, and pure water of 100 ml was added to the flask so as to be fully stirred. Then a measuring pipet with a rubber plug was attached to the erlenmeyer flask and left to stand for 8 hours at 40° C. Then, a gas generation amount was measured.

Figure 2:
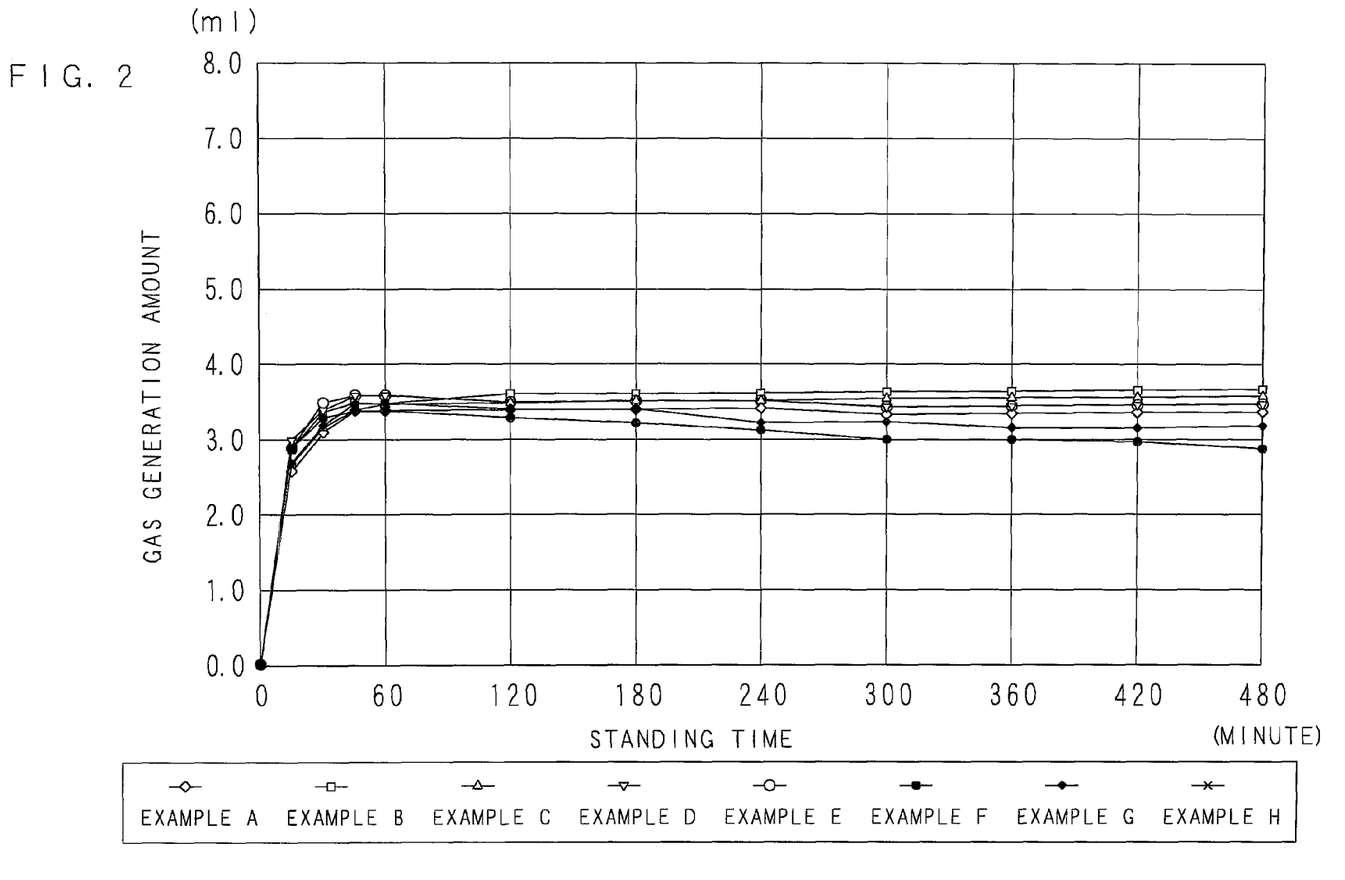
FIG. 2 is a graph illustrating the relationship between a standing time and a gas generation amount in a stability evaluation test to water.

FIG. 2 is a graph illustrating a relationship between a standing time and a gas generation amount in the test.

According to the graph of FIG. 2, it was found out that when the water-based rust preventive pigment blended with a nitrate was used, generation of hydrogen caused by reacting zinc with water can be suppressed in the water-based rust preventive paint, and the storing stability was improved. Further, the storing stability was not nearly unaffected by the blending amount of 3-aminopropyltriethylethoxy silane and the existence or nonexistence of addition of the colloidal silica.

Accordingly, since the water-based rust preventive pigment of the present invention has the aforementioned composition, generation of hydrogen gas caused by reacting zinc with water was suppressed for a long period of time even in a state that the water-based rust preventive pigment was dispersed in water when the water-based rust preventive paint was blended using the water-based rust preventive pigment. Therefore, it was confirmed that the water-based lust preventive paint was excellent in the long-term storing stability.

(3) Water-Based Top Coat Paint

A blending example (mass part) of the water-based top coat paint of the present invention is shown in Table 3.

TABLE 3

(MASS PART)

| | BLENDING EXAMPLE | | | | | | | | | |
|---|---|---|---|---|---|---|---|---|---|---|
| | A | B | C | D | E | F | G | H | I | J |
| WATER | 67.36 | 67.36 | 67.36 | 67.36 | 67.36 | 67.36 | 67.36 | 67.36 | 47.47 | 47.47 |
| Iriodin 103WNT | 6 | 6 | 6 | 6 | 6 | 6 | 6 | 6 | 3.5 | 3.5 |
| AW - 15F | 0.24 | 0.24 | 0.24 | 0.24 | 0.24 | 0.24 | 0.24 | 0.24 | 0.13 | 0.13 |
| Lazerflair800 | — | — | — | — | — | — | — | — | 1.5 | 1.5 |
| SODIUM TUNGSTATE | 3.2 | 3.2 | 3.2 | 3.2 | 3.2 | 3.2 | 3.2 | 3.2 | 2 | 2 |
| LITHIUM SILICATE (ACTIVE INGREDIENT 23%) | — | — | — | 4.8 | 10 | 8 | 16 | 32 | — | — |
| LITHIUM SILICATE (ACTIVE INGREDIENT 22%) | — | 10 | — | — | — | — | — | — | — | — |
| LITHIUM SILICATE (ACTIVE INGREDIENT 21%) | — | — | 10 | — | — | — | — | — | — | — |
| LITHIUM SILICATE (ACTIVE INGREDIENT 20%) | — | — | — | — | — | — | — | — | 6 | 10 |
| AMINOPROPYL-TRIETHOXY SILANE | 32 | 32 | 32 | 32 | 32 | 32 | 32 | 32 | 20 | 20 |
| T. C. P. - 10. U | 4 | 4 | 4 | 4 | 4 | 4 | 4 | 4 | 8 | 8 |
| URETHANE RESIN | — | — | — | — | — | — | — | — | 10 | 10 |

TABLE 3-continued

| | BLENDING EXAMPLE | | | | | | | | | | (MASS PART) |
|---|---|---|---|---|---|---|---|---|---|---|---|
| | A | B | C | D | E | F | G | H | I | J | |
| SN Defoamer5016 | 0.1 | 0.1 | 0.1 | 0.1 | 0.1 | 0.1 | 0.1 | 0.1 | 0.1 | 0.1 | |
| BYK333 | — | — | — | — | — | — | — | — | 0.1 | 0.1 | |
| Dynol 604 | 0.1 | 0.1 | 0.1 | 0.1 | 0.1 | 0.1 | 0.1 | 0.1 | 0.1 | 0.1 | |
| TOTAL | 114 | 124 | 124 | 118.8 | 124 | 122 | 130 | 146 | 99.3 | 103.3 | |
| OCCURRENCE OF GELLING | X | X | X | X | ○ | ○ | ○ | H | — | — | |

Blending Example A

According to the blending ratio in Table 3, a water-based top coat paint according to Blending example A was acquired by mixing and stirring water, Iriodin103WNT (a pearl pigment, produced by Merck & Co., Inc.), AW-15F (hydroxylethyl cellulose, produced by FUJICHEMI HEC CO., LTD.), a sodium tungstate, aminopropyltriethoxy silane, T.C.P-10.U (hydroxy apatite, produced by TAIEI CHEMICAL INDUSTRIAL CO., LTD.), SN DEFOAMER 5016 (a defoamant, produced by SAN NOPCO LIMITED), and Dynol 604 (a surface adjusting agent, produced by Air Products and Chemicals, Inc.) for 1 hour.

Blending Example B

A water-based top coat paint as Blending example B was acquired by the same process as that of Blending example A except that lithium silicate (active ingredient: 22%, a mol ratio of $SiO_2/Li_2O$ was within from 4.2 to 4.8) of 10 mass parts was added.

Blending Example C

A water-based top coat paint as Blending example C was acquired by the same process as that of Blending example A except that lithium silicate (active ingredient: 21%, a mol ratio of $SiO_2/Li_2O$ was within from 7.2 to 7.8) of 10 mass parts was added.

Blending Example D

A water-based top coat paint as Blending example D was acquired by the same process as that of Blending example A except that lithium silicate (active ingredient: 23%, a mol ratio of $SiO_2/Li_2O$ was within from 3.2 to 3.8) of 4.8 mass parts was added.

Blending Example E

A water-based top coat paint as Blending example E was acquired by the same process as that of Blending example A except that lithium silicate (active ingredient: 23%) of 10 mass parts was added.

Blending Example F

A water-based top coat paint as Blending example F was acquired by the same process as that of Blending example A except that lithium silicate (active ingredient: 23%) of 8 mass parts was added.

Blending Example G

A water-based top coat paint as Blending example G was acquired by the same process as that of Blending example A except that lithium silicate (active ingredient: 23%) of 16 mass parts was added.

Blending Example H

A water-based top coat paint as Blending example H was acquired by the same process as that of Blending example A except that lithium silicate (active ingredient: 23%) of 32 mass parts was added.

Blending Example I

A water-based top coat paint as Blending example I was acquired by the same process as that of Blending example A except that Lazerflair 800 (mica, produced by Merck & Co., Inc.) of 1.5 mass parts, sodium tungstate of 2 mass parts, lithium silicate (active ingredient: 20%) of 6 mass parts, aminopropyltriethoxy silane of 20 mass parts, T.C.P-10.U of 8 mass parts, a urethane resin of 10 mass parts, and BYK333 (a surface adjusting agent: silicone, produced by BYK-Chemie Corporation) of 0.1 mass parts were added.

Blending Example J

A water-based top coat paint as Blending example J was acquired by the same process as that of Blending example I except that lithium silicate (active ingredient: 20%) of 10 mass parts was added.

The following confirmation test of an existence of gelling was carried out. The test is for confirming the occurrence of gelling when coating powder of a water-based lust preventive paint of Example M described below were mixed into the water-based top coat paints of Blending examples A to H as impurities.

[Occurrence of Gelling Confirmation Test]

The water-based rust preventive pigment of Example M was dried at 180° C. for 1 hour and pulverized into a powdered state. The powder of 3 mass % was mixed into each of water-based top coat paint of Blending examples A to H, and heated at 35° C. After 1 day, states of the water-based top coat paints were observed.

The results are shown in Table 3. A case of gelling was indicated with a mark x, and a case of not gelling was indicated with a mark O.

As shown in Table 3, it was found that gelling occurred in Blending example D in which a mass ratio of lithium silicate to aminopropyltriethoxy silane was 10.8%, but gelling was suppressed in Blending example F in which the ratio was 18%, and gelling was suppressed in Blending example H in which the ratio was 71.9%. Therefore, when the ratio was approximately within from 18% to 72%, gelling was suppressed properly. Further, a mol ratio of $SiO_2/Li_2O$ was preferably within from 3.2 to 3.8.

Accordingly, by blending lithium silicate in the water-based top coat paint, as describing below, it was confirmed that the second coating film can be formed without causing gelling even when the powder of the first coating film was mixed into the water-based top coat paint as impurities, in a case that the first coating film is formed on the iron base material of the parts of the highly corrosion resistant surface-treated chain of the present invention using the water-based top coat paint, and the water-based top coat paint is formed on the first coating film by a dipping spin coat method.

(4) Highly Corrosion Resistant Surface-Treated Chain

A highly corrosion resistant surface-treated chain of the present invention will be described below with specific examples.

Example I

Figure 3:
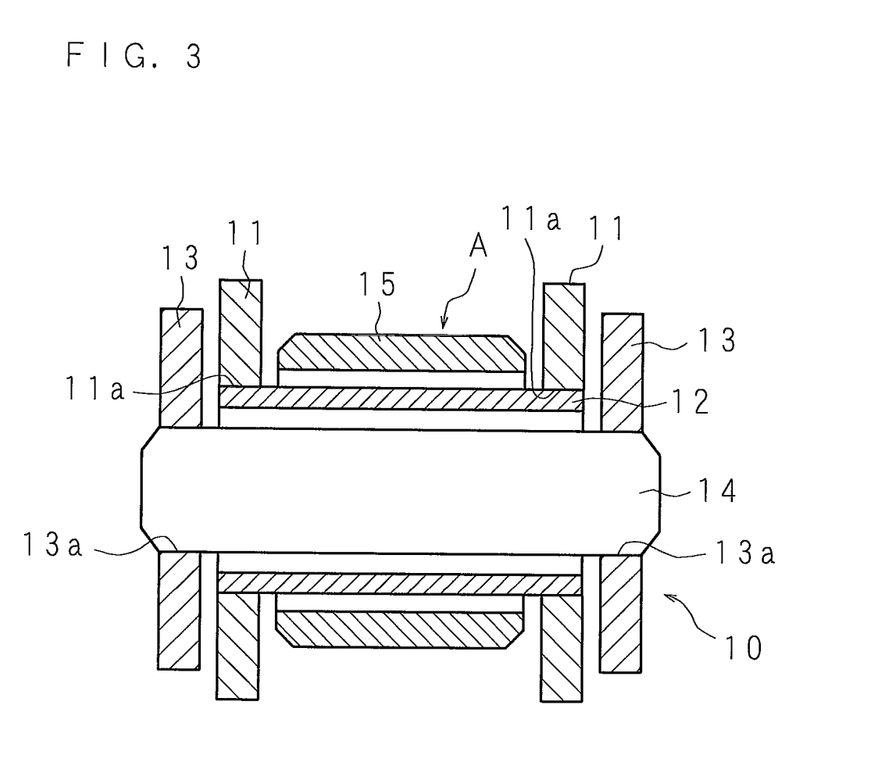
FIG. 3 is a partial cross sectional view to illustrate a highly corrosion resistant surface-treated chain according to the embodiment 1 of the present invention.
Figure 4:
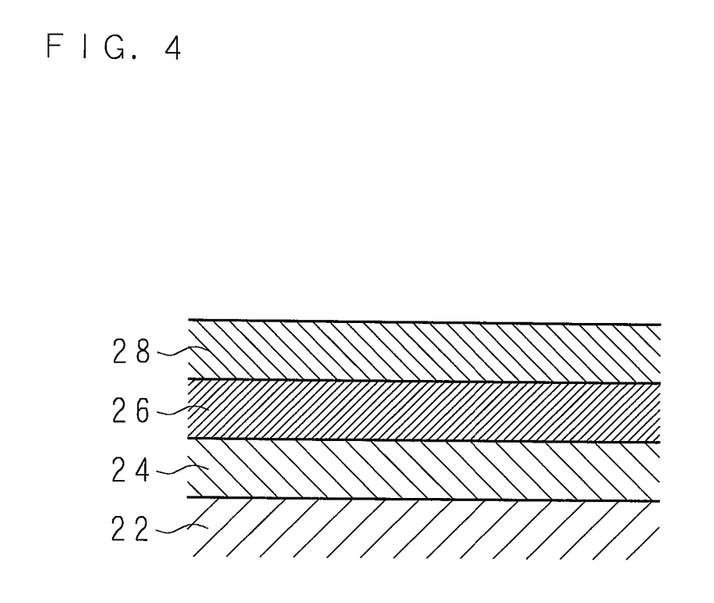
FIG. 4 is an enlarged cross sectional view to illustrate the portion A in FIG. 3.

FIG. 3 is a cross sectional view to illustrate a roller chain 10 according to Example 1, and FIG. 4 is an enlarged cross sectional view of the portion A in FIG. 3.

As shown in FIGS. 3 and 4, the roller chain 10 includes a pair of right and left inner link plates 11 and 11 provided separately, a bushing 12 pressed in and fitted to bushing pressing-in holes 11a and 11a of the inner link plates 11 and 11, a pair of right and left outer link plates 13 and 13 provided on the out sides of the inner link plates 11 and 11 and connected with front and back inner link plates 11 and 11, a connection pin 14 loosely fitted to an inner peripheral face of the bushing 12 and pressed in and fitted to pin pressing-in holes 13a and 13a of the outer link plates 13 and 13, and a roller 15 loosely fitted to an outer peripheral face of the bushing 12.

As shown in FIG. 4, the inner link plate 11, the bushing 12, the outer link plate 13, the connection pin 14, and the roller 15 respectively have a zinc-iron alloy ground layer 24 formed on an iron base material 22 by impact zinc plating, a first coating film 26 formed using the water-based rust preventive paint, and a second coating film 28 formed using a water-based top coat paint containing a water-based pigment and a water-soluble or hydrolyzable silane coupling agent containing an amino group.

The blending ratio (mass ratio) of the water-based rust preventive paint used for the first coating film 26 was shown in Example K in the following Table 4.

According to the blending ratio in Example K, a water-based zinc rust preventive pigment (a zinc paste) contained in the water-based rust preventive paint was acquired by mixing and stirring a flake-formed zinc powder (an average longitudinal diameter of 15 μm, and average thickness of 0.5 μm), ethylhexyl thioglycolate, a surfactant (1), and a dispersion auxiliary in dipropyleneglycolmonomethylether for 3 hours, and further adding and mixing nickel nitrate to them, and stirring.

TABLE 4

| | | | | | (MASS PART) |
| | | | EXAMPLE | | |
| | K | L | M | N | O |
|---|---|---|---|---|---|
| ZINC PASTE | 56.00 | 56.00 | 56.00 | 56.00 | 56.00 |
| DIPROPYLENEGLYCOLMONOMETHYLETHER | 15.40 | 15.40 | 15.40 | 15.40 | 15.40 |
| SURFACTANT (1) | 0.36 | 0.36 | 0.36 | 0.36 | 0.36 |
| DISPERSION AUXILIARY | 0.28 | 0.28 | 0.28 | 0.28 | 0.28 |
| ETHYLHEXYL THIOGLYCOLATE | 2.35 | 2.35 | 2.35 | 2.35 | 2.35 |
| Zn | 35.28 | 35.28 | 35.28 | 35.28 | 35.28 |
| $Ni(NO_3)_2 \cdot 6H_2O$ | 2.32 | 0.00 | 0.00 | 0.00 | 1.12 |
| $Mg(NO_3)_2 \cdot 6H_2O$ | 0.00 | 2.32 | 2.32 | 2.32 | 1.12 |
| SURFACTANT (1) | 0.50 | 0.50 | 0.50 | 0.50 | 0.50 |
| WATER | 5.40 | 5.40 | 5.40 | 5.40 | 5.40 |
| SURFACTANT (2) | 3.60 | 3.60 | 3.60 | 3.60 | 3.60 |
| DIPROPYLENEGLYCOLMONOMETHYLETHER | 24.50 | 24.50 | 24.50 | 24.50 | 24.50 |
| Al PASTE FW-610 | 0.00 | 0.00 | 9.50 | 9.50 | 0.00 |
| Al | 0 | 0 | 5.80 | 5.80 | 0 |
| SURFACTANT, WATER-SOLUBLE SOLVENT | 0 | 0 | 3.70 | 3.70 | 0 |
| CATALOID SI550 | 0 | 0 | 0 | 5 | 0 |
| TOTAL | 90.00 | 90.00 | 99.50 | 99.50 | 90.00 |

A water-based rust preventive paint according to Example K was acquired by blending a surfactant (1), water, a surfactant (2), dipropyleneglycolmonomethylether, a water-based Al rust preventive pigment (an Al paste) FW-610, and Cataloid S1550 (colloidal silica, produced by JGC Catalysts and Chemicals Ltd.) with the zinc paste.

The first coating film 26 having a thickness of 5 µm was formed by coating the iron base material 22 of the chain component parts (the inner link plate 11, the bushing 12, the outer link plate 13, the connection pin 14, and the roller 15) with the zinc-iron alloy ground layer 24 formed by impact zinc plating, then coating the zinc-iron alloy ground layer 24 by a dipping spin coat method using the water-based rust preventive paint of Example K, and baking it at 180° C. for 40 minutes as shown in Table 5. Further the second coating film having a thickness of 3 µm was formed by coating the first coating film 26 by a dipping spin coat method using the water-based top coat paint of Blending example A in Table 3, and baking it at 180° C. for 40 minutes.

Accordingly, the roller chain 10 according to Example I was made.

ventive paint according to Example L in Table 4, in which the zinc paste contained magnesium nitrate instead of nickel nitrate.

Example III

A roller chain 10 according to Example III was made by subjecting the chain component parts to the surface treatment by the same process as that of Example I except that the first coating film 26 was formed using the water-based rust preventive paint according to Example O in Table 4, in which the zinc paste contained magnesium nitrate in addition to nickel nitrate.

Example IV

A roller chain 10 according to Example IV was made by subjecting the chain component parts to the surface treatment

TABLE 5

|  | EXAMPLE I | EXAMPLE II | EXAMPLE III | EXAMPLE IV | EXAMPLE V | EXAMPLE VI | EXAMPLE VII |
|---|---|---|---|---|---|---|---|
| GROUND TREATMENT | IMPACT ZINC PLATING | | | | | | |
| FIRST COATING FILM | EXAMPLE K | EXAMPLE L | EXAMPLE O | EXAMPLE M | EXAMPLE N | EXAMPLE M | EXAMPLE M |
| FILM THICKNESS (µm) | 5 | 5 | 5 | 5 | 5 | 5 | 5 |
| SECOND COATING FILM | BLENDING EXAMPLE A | BLENDING EXAMPLE A | BLENDING EXAMPLE A | BLENDING EXAMPLE A | BLENDING EXAMPLE A | BLENDING EXAMPLE I | BLENDING EXAMPLE I |
| FILM THICKNESS (µm) | 3 | 3 | 3 | 3 | 3 | 3 | 3 |
| RUST GENERATING TIME (h) | | | | | | | |
| TACKED PORTION | 150 | 200 | 150 | 700 | 750 | 300 | 840 |
| OUTER LINK PLATE | 200 | 300 | 200 | 900 | 1000 | 500 | 1200 |

|  | EXAMPLE VIII | EXAMPLE IX | EXAMPLE X | EXAMPLE XI | EXAMPLE XII | EXAMPLE XIII | EXAMPLE XIV | EXAMPLE XV |
|---|---|---|---|---|---|---|---|---|
| GROUND TREATMENT | SHOT BLASTING | | | | | | | |
| FIRST COATING FILM | EXAMPLE K | EXAMPLE L | EXAMPLE M | EXAMPLE N | EXAMPLE K | EXAMPLE L | EXAMPLE M | EXAMPLE N |
| FILM THICKNESS (µm) | 5 | 5 | 5 | 5 | 5 | 5 | 5 | 5 |
| SECOND COATING FILM | BLENDING EXAMPLE A | BLENDING EXAMPLE A | BLENDING EXAMPLE A | BLENDING EXAMPLE A | EXAMPLE K | EXAMPLE L | EXAMPLE M | EXAMPLE N |
| FILM THICKNESS (µm) | 3 | 3 | 3 | 3 | 3 | 3 | 3 | 3 |
| RUST GENERATING TIME (h) | | | | | | | | |
| TACKED PORTION | 70 | 80 | 150 | 200 | 48 | 48 | 48 | 48 |
| OUTER LINK PLATE | 150 | 170 | 500 | 600 | 100 | 110 | 400 | 500 |

|  | COMPARATIVE EXAMPLE I | COMPARATIVE EXAMPLE II |
|---|---|---|
| GROUND TREATMENT | IMPACT ZINC PLATING | SHOT BLASTING |
| EXTERNAL PLATE | NONE | NONE |
| FILM THICKNESS (µm) | 5 | 5 |
| SECOND COATING FILM | NONE | NONE |
| FILM THICKNESS (µm) | 3 | 3 |
| RUST GENERATING TIME (h) | | |
| TACKED PORTION | 24 | 2 |
| OUTER LINK PLATE | 24 | 2 |

Example II

A roller chain 10 according to Example II was made by subjecting the chain component parts to the surface treatment by the same process as that of Example I except that the first coating film 26 was formed using the water-based rust preby the same process as that of Example I except that the first coating film 26 was formed using the water-based rust preventive paint according to Example M in Table 4, in which the zinc paste contained magnesium nitrate instead of nickel nitrate and further contained Asahi KASEI ALUMINUM PASTE FW-610 (produced by ASAHI KASEI CHEMICALS CORPORATION).

Example V

A roller chain 10 according to Example V was made by subjecting the chain component parts to the surface treatment by the same process as that of Example I except that the first coating film 26 was formed using the water-based rust preventive paint according to Example N in Table 4, in which the zinc paste contained magnesium nitrate instead of nickel nitrate, and further contained Asahi KASEI ALUMINUM PASTE FW-610 and Cataloid SI550.

Example VI

A roller chain 10 according to Example VI was made by subjecting the chain component parts to the surface treatment by the same process as that of Example I except that the first coating film 26 was formed using the water-based rust preventive paint according to Example M in Table 4, and the second coating film 28 was formed using the water-based top coat paint according to Blending example I in Table 3.

Example VII

A roller chain 10 according to Example VII was made by subjecting the chain component parts to the surface treatment by the same process as that of Example I except that the first coating film 26 was formed using the water-based rust preventive paint according to Example M in Table 4, and the second coating film 28 was formed using the water-based top coat paint according to Blending example J in Table 3.

Example VIII

A roller chain 10 according to Example VIII was made by the same process as that of Example I except that the iron base material 22 was subjected to shot blasting instead of forming the zinc-iron alloy ground layer 24 on the iron base material 22 of the chain component parts.

Example IX

A roller chain 10 according to Example IX was made by the same process as that of Example VIII except that the first coating film 26 was formed using the water-based rust preventive paint according to Example L instead of the water-based rust preventive paint according to Example K.

Example X

A roller chain 10 according to Example X was made by the same process as that of Example VIII except that the first coating film 26 was formed using the water-based rust preventive paint according to Example M instead of the water-based rust preventive paint according to Example K.

Example XI

A roller chain 10 according to Example XI was made by the same process as that of Example VIII except that the first coating film 26 was formed using the water-based rust preventive paint according to Example N instead of the water-based rust preventive paint according to Example K.

Example XII

A roller chain 10 according to Example XII was made by the same process as that of Example VIII except that the second coating film 28 was formed using the water-based rust preventive paint according to Example K instead of the water-based top coat paint according to Blending example A.

Example XIII

A roller chain 10 according to Example XIII was made by the same process as that of Example VIII except that the first coating film 26 was formed using the water-based rust preventive paint according to Example L instead of the water-based rust preventive paint according to Example K, and the second coating film 28 was formed using the water-based rust preventive paint according to Example L instead of the water-based top coat paint according to Blending example A.

Example XIV

A roller chain 10 according to Example XIV was made by the same process as that of Example VIII except that the first coating film 26 was formed using the water-based rust preventive paint according to Example M instead of the water-based rust preventive paint according to Example K, and the second coating film 28 was formed using the water-based rust preventive paint according to Example M instead of the water-based top coat paint according to Blending example A.

Example XV

A roller chain 10 according to Example XV was made by the same process as that of Example VIII except that the first coating film 26 was formed using the water-based rust preventive paint according to Example N instead of the water-based rust preventive paint according to Example K, and the second coating film 28 was formed using the water-based rust preventive paint according to Example N instead of the water-based top coat paint according to Blending example A.

Comparative Example I

A roller chain 10 according to Comparative example I was made by the same process as that of Example I except that the first coating film 26 and the second coating film 28 were not formed.

Comparative Example II

A roller chain 10 according to Comparative example II was made by the same process as that of Example VIII except that the first coating film 26 and the second coating film 28 were not formed.

[Salt Spray Test]

The roller chains of Examples I to XV and Comparative example I and II were subjected to salt spray tests. The test was carried out according to JIS-K5600-7-1. A time until visually appearing red rust at the tacked portion of the outer link plate 13 and the connection pin 14 and on the surface of the outer link plate 13 was measured. These results were shown in Table 5.

Clearly from Table 5, Examples I to VII in which the first coating film 26 and the second coating film 28 were formed on the zinc-iron alloy ground layer 24 had remarkably improved corrosion resistance than that of Comparative example I in which the first coating film 26 and the second coating film 28 were not formed.

Example II in which magnesium nitrate was blended as a nitrate with the water-based rust preventive pigment had better corrosion resistance than that of Example I in which nickel nitrate was blended as the nitrate. Example III in which equal amounts of nickel nitrate and magnesium nitrate were blended had approximately equal corrosion resistance to that of Example I. Example IV in which the water-based Al rust preventive pigment was blended with the water-based zinc rust preventive pigment had more improved corrosion resistance. Example V in which colloidal silica was blended in addition to the water-based Al rust preventive pigment had further more improved corrosion resistance.

Examples I, II, IV and V in which an impact zinc plating treatment was carried out as a ground treatment had more improved corrosion resistances than those of Examples VIII, IX, X and XI in which the ground treatment was carried out by shot blasting and the first coating film 26 and the second coating film 28 were formed so as to have the same structures as those in Examples I, II, IV and V.

Comparative example I had also improved corrosion resistance than that of Comparative example II in which the iron base material 22 was subjected to the ground treatment by shot blasting and the first coating film 26 and the second coating film 28 were not formed.

Examples XII to XV in which the second coating film 28 was formed using the water-based rust preventive paint used for forming the first coating film 26 had lower corrosion resistances than those of Examples VIII to XI in which the second coating film 28 was formed using the water-based top coat paint of Blending example A.

Example VII having higher content of lithium silicate in the water-based top coat paint than that of Example VI had improved corrosion resistance.

Accordingly, it was confirmed that the roller chain 10 of this embodiment including the zinc-iron alloy ground layer 24 formed on the iron base material 22 of the component part by impact zinc plating, the first coating film 26 formed using the water-based rust preventive paint of this embodiment, and the second coating film 28 formed using the water-based top coat paint of this embodiment, had remarkably excellent corrosion resistance and improved durability of the chain.

Further, since the peeling of the first coating film 26 was prevented by the second coating film 28, the repairing of the pressed-in portion of the inner link plate 11 and the bushing 12 and the tacked portion of the outer link plate 13 and the connection pin 14 at the time of assembling of the chain can be omitted. Therefore, the bending failure of a chain and the rotation failure of a roller conventionally caused by sliding resistances between chain component parts, e.g., between a connection pin and a bushing and between a bushing and a roller, can be suppressed.

Further, since the water-based rust preventive paint and the water-based top coat paint of this embodiment have the aforementioned structures, these coatings can be treated at a temperature of 180° C. or less for approximately 30 to 40 minutes when baking and drying these coatings. Thus, the hardness of the chain component parts does not decrease, and reduction in strength of a chain and the life of a chain is suppressed.

Furthermore, the roller chain 10 of this embodiment does not have a conventional problems of hydrogen brittleness generated in electroplating and a pickling process, and environmental pollution of hexavalent chromium caused by a dacrotized coating. Thus, this embodiment has excellent effects.

INDUSTRIAL APPLICABILITY

The present invention is a highly corrosion resistant surface-treated chain such as a bushing chain and a roller chain used under a corrosion atmosphere, which can be applied to various kinds of applications such as a conveyor chain, a conveyance chain, and a transmission chain.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A rust preventive pigment comprising
    powder of a base metal containing zinc,
    an organic compound containing a mercapto group and coating said powder of the base metal, and
    a nitrate, which promotes coating of said organic compound to said powder of the base metal, comprising potassium nitrate, calcium nitrate, magnesium nitrate, nickel nitrate, or cobalt nitrate,
    wherein the amount of the organic compound to 100 parts by mass of the base metal powder is in a range of 1 to 13 parts by mass and the amount of the nitrate to 100 parts by mass of the base metal powder is in a range of 0.1 to 10 parts by mass.

2. The rust preventive pigment according to claim 1, further comprising a magnesium compound.

3. A water-based rust preventive paint comprising the rust preventive pigment according to claim 2.

4. A highly corrosion resistant surface-treated chain, wherein said chain is constructed by a pair of outer link plates and a pair of inner link plates connected alternately,
    parts including said outer link plates and said inner link plates are made of an iron base material, and
    a first coating film is formed on the iron base material of said parts using the water-based rust preventive paint according to claim 3.

5. The rust preventive pigment according to claim 1, wherein said nitrate is magnesium nitrate or nickel nitrate.

6. A water-based rust preventive paint comprising the rust preventive pigment according to claim 5.

7. A highly corrosion resistant surface-treated chain, wherein said chain is constructed by a pair of outer link plates and a pair of inner link plates connected alternately,
    parts including said outer link plates and said inner link plates are made of an iron base material, and
    a first coating film is formed on the iron base material of said parts using the water-based rust preventive paint according to claim 6.

8. A water-based rust preventive paint comprising the rust preventive pigment according to claim 1.

9. The water-based rust preventive paint according to claim 8, further comprising a rust preventive pigment containing aluminum.

10. The water-based rust preventive paint according to claim 9, further comprising colloidal silica.

11. A highly corrosion resistant surface-treated chain, wherein said chain is constructed by a pair of outer link plates and a pair of inner link plates connected alternately,
    parts including said outer link plates and said inner link plates are made of an iron base material, and
    a first coating film is formed on the iron base material of said parts using the water-based rust preventive paint according to claim 10.

12. A highly corrosion resistant surface-treated chain, wherein said chain is constructed by a pair of outer link plates and a pair of inner link plates connected alternately, parts including said outer link plates and said inner link plates are made of an iron base material, and a first coating film is formed on the iron base material of said parts using the water-based rust preventive paint according to claim 9.

13. A highly corrosion resistant surface-treated chain, wherein said chain is constructed by a pair of outer link plates and a pair of inner link plates connected alternately, parts including said outer link plates and said inner link plates are made of an iron base material, and a first coating film is formed on the iron base material of said parts using the water-based rust preventive paint according to claim 8.

14. The highly corrosion resistant surface-treated chain according to claim 13, comprising a zinc-iron alloy ground layer formed between said iron base material and said first coating film by impact zinc plating.

15. The highly corrosion resistant surface-treated chain according to claim 14, comprising a second coating film formed on said first coating film using a water-based top coat paint containing a pigment and a water-soluble or hydrolyzable silane coupling agent containing an amino group.

16. The highly corrosion resistant surface-treated chain according to claim 15, wherein said water-based top coat paint further comprises a tungsten compound, hydroxy apatite, and a pearl pigment.

17. The highly corrosion resistant surface-treated chain according to claim 16, wherein said water-based top coat paint further comprises lithium silicate.

18. The highly corrosion resistant surface-treated chain according to claim 13, comprising a second coating film formed on said first coating film using a water-based top coat paint containing a pigment and a water-soluble or hydrolyzable silane coupling agent containing an amino group.

19. The highly corrosion resistant surface-treated chain according to claim 18, wherein said water-based top coat paint further comprises a tungsten compound, hydroxy apatite, and a pearl pigment.

20. The highly corrosion resistant surface-treated chain according to claim 19, wherein said water-based top coat paint further comprises lithium silicate.

* * * * *